May 7, 1963 M. J. GRADY 3,088,704
SUPPLEMENTAL SEAT FOR VEHICLES
Filed April 2, 1959 3 Sheets-Sheet 1
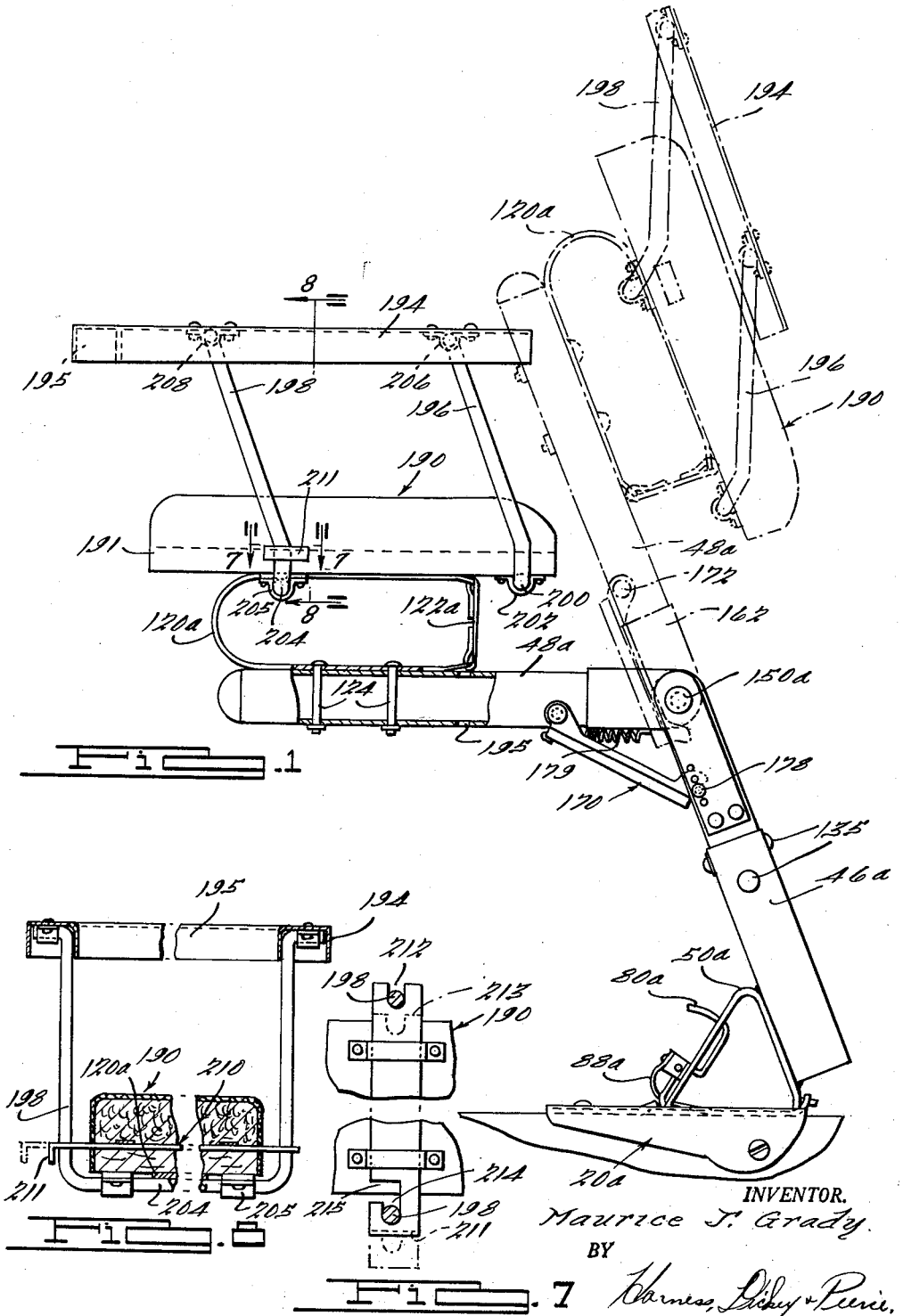
INVENTOR.
Maurice J. Grady
BY
Harness, Dickey & Pierce
ATTORNEYS May 7, 1963
M. J. GRADY
3,088,704
SUPPLEMENTAL SEAT FOR VEHICLES
Filed April 2, 1959
3 Sheets-Sheet 2
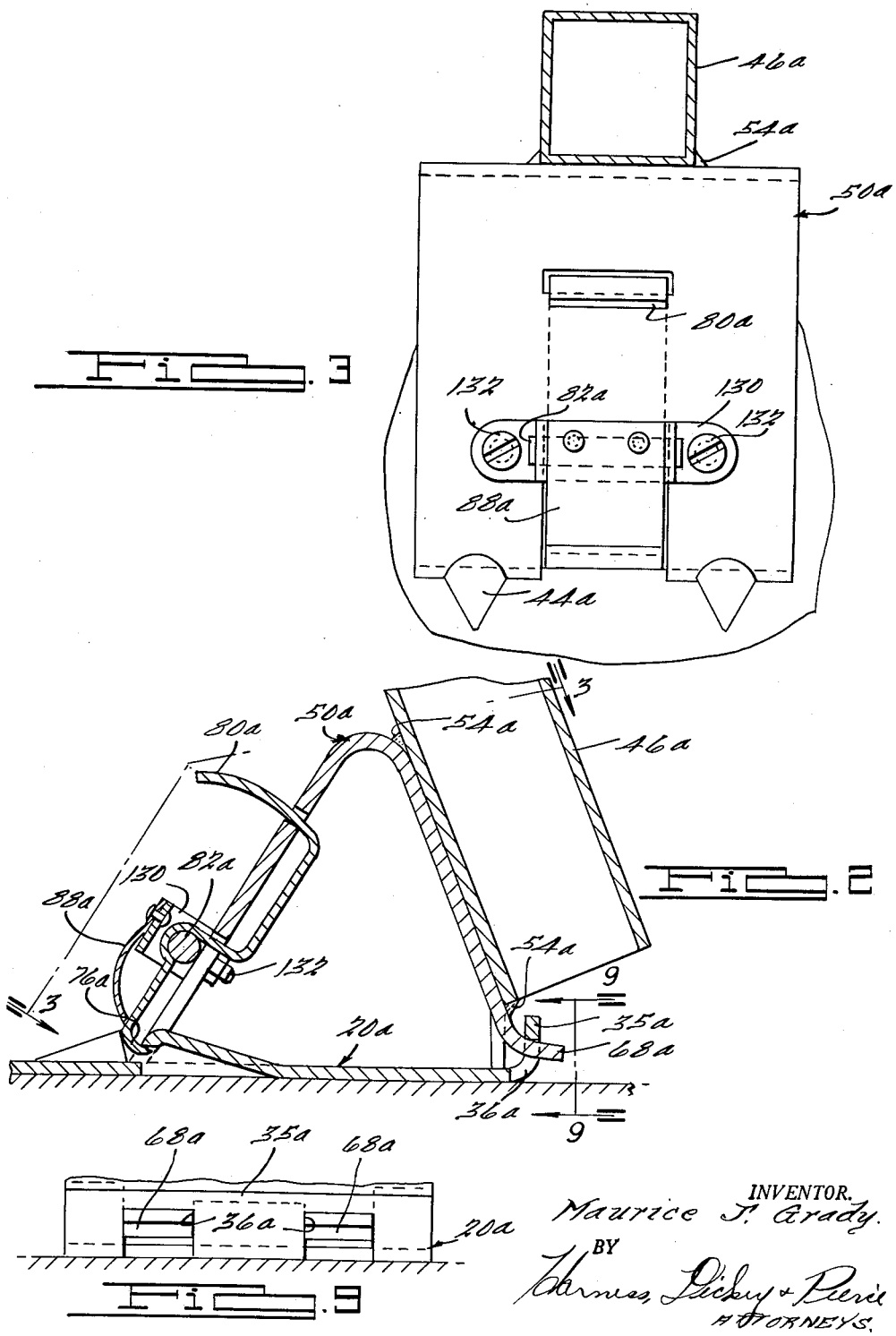
INVENTOR.
Maurice J. Grady.
BY
Harness, Dickey & Pierce
ATTORNEYS.

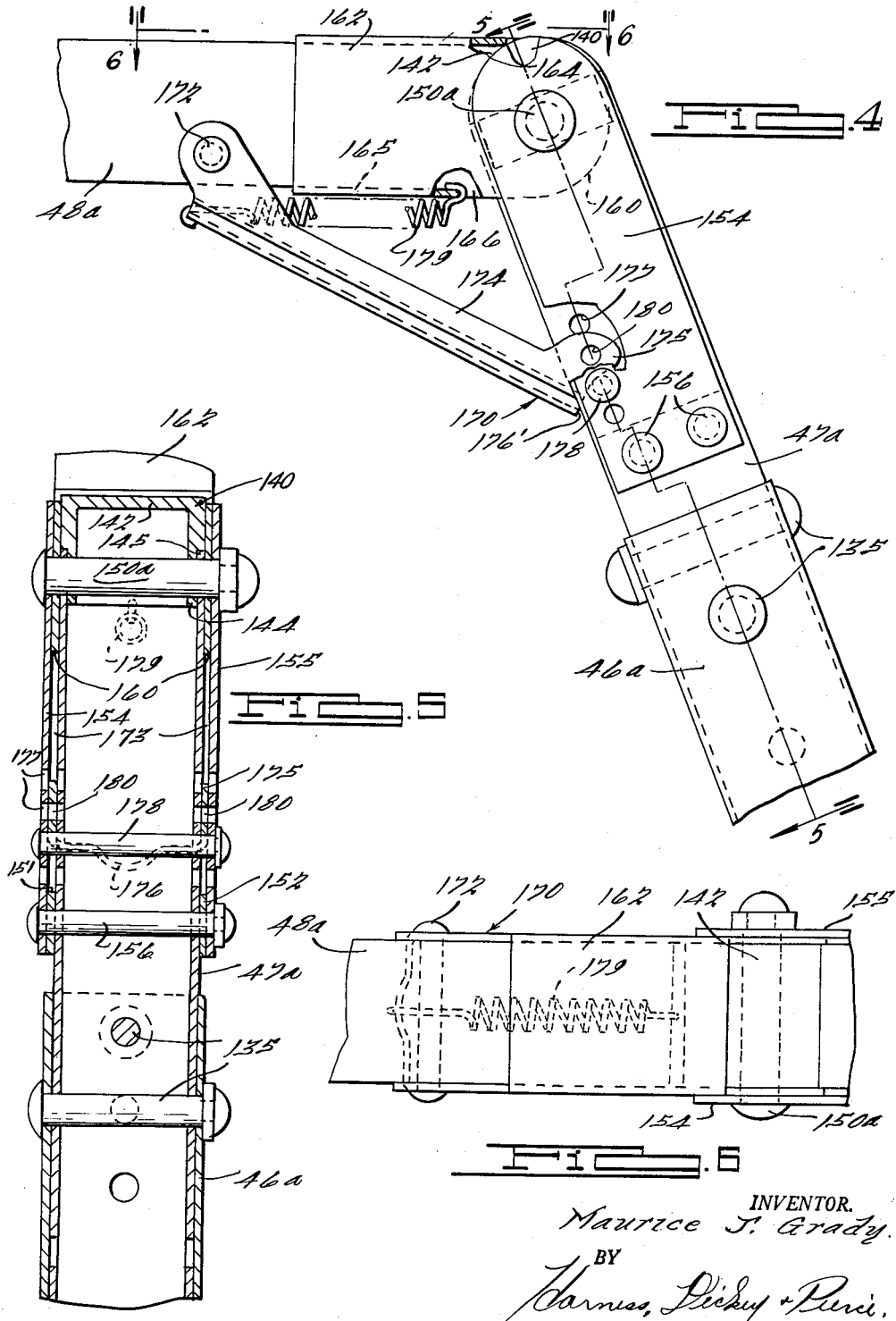

United States Patent Office 3,088,704
Patented May 7, 1963

3,088,704
SUPPLEMENTAL SEAT FOR VEHICLES
Maurice J. Grady, 888 W. Baltimore, Detroit, Mich.
Filed Apr. 2, 1959, Ser. No. 803,646
4 Claims. (Cl. 248—371)

This application is a continuation-in-part of my co-pending application, Serial No. 466,961, filed November 5, 1954 which became U.S. Patent 2,886,093 granted May 12, 1959. The present invention relates to vehicle seats, and particularly to a new and improved auxiliary seat intended especially for the use of children when riding in motor vehicles.

An important object of the invention is to provide an improved automobile seat for children which provides increased safety for the child, which is comfortable and attractive to children, and which is so positioned that the child's head when occupying the seat is at approximately the same elevation as that of an adult occupant of the regular seats of the car, so that the child is afforded a better view from the vehicle.

A further object is to provide such a seat which does not detract from the adult seating space.

A further object is to provide such a seat which is easily and quickly adjustable to accommodate children of different sizes.

Still another object is to provide such a seat which is easily displaced, merely by tilting it forward on a hinge, to permit easy passage of other occupants into and from the car or from one side of the car to the other.

Still another object is to provide such a seat which is very compact and which is easily and quickly removable and adapted to be carried in the trunk of the car or removed entirely when not needed.

Still another object is to provide such a seat which may be very easily and quickly installed in the vehicle, and as easily removed therefrom.

Still another object is to provide such a seat which is adapted to be supported entirely from the floor of the vehicle, by means of an anchor plate which is permanently attached to the vehicle floor.

In an automobile of the sedan type, if desired, two such anchor plates may be provided, one in the front compartment and one in the rear compartment, even though it is only desired to employ a single seat. The seat may then be selectively installed either in the front compartment or the rear compartment, and easily moved from one compartment to the other at will, so that the child may ride in the front with the driver when no other adults are present, or if desired, may be placed in the rear compartment.

A further very important object is to position the child, whether the seat be installed in the front or rear compartment, in a position of increased safety. When the seat is installed in the rear compartment of a sedan, the child is positioned in the middle and directly behind the back of the front seat, where he can conveniently lean upon or rest his elbows upon the back of the front seat, which is a position children naturally like to assume and frequently do assume merely by standing in the rear compartment, where no special seat is provided for them. In this position, in the event of a sudden stop or accident the child can only move a few inches before his forward movement is arrested by the cushioning afforded by the back of the front seat, and cannot be thrown forwardly for a greater distance or upwardly and forwardly in such manner that he might fly over the front seat and into the windshield or forward portions of the car structure. If my improved seat is installed in the front compartment, the child is positioned close to the instrument panel, which, in many modern cars, is padded. In event no padding is provided, however, a child again, can only move forwardly a relatively few inches before striking the instrument panel, so that the possible momentum and impact, in event of a sudden stop or accident, are limited to this extent.

Still another object is to provide such an improved child's seat which is simple and inexpensive to construct, rigid in construction, and well adapted to quantity production methods.

Still another object is to provide an improved construction of the indicated character having no parts by which a child or user of the seat can be pinched or injured, even if the fingers should be placed in the foldable parts.

Other objects and advantages will become apparent upon consideration of the present disclosure in its entirety.

Referring now to the drawings:

FIG. 1 is a side elevational view showing my improved seat as used when in position in a motor car;

FIG. 2 is an enlarged fragmentary vertical sectional elevational view showing the principal parts of the pedestal supporting means;

FIG. 3 is a fragmentary sectional elevational view taken substantially as indicated by the line and arrows 3—3 of FIG. 2;

FIG. 4 is a fragmentary side elevational view of the jointed portions of the two-part pedestal structure.

FIG. 5 is a longitudinal sectional view taken substantially on the line 5—5 of FIG. 4 and looking in the direction of the arrows;

FIG. 6 is a fragmentary plan view taken substantially on the line 6—6 of FIG. 4 and looking in the direction of the arrows;

FIGS. 7 and 8 are sectional detail views taken substantially on the lines 7—7 and 8—8, respectively, of FIG. 1, and looking in the direction of the arrows;

FIG. 9 is a fragmentary elevational view taken substantially as indicated by the line and arrows 9—9 of FIG. 2.

As shown in FIGS. 1 and 2, the sheet metal anchor plate 20a supports a bracket member 50a, which is releasably held to the anchor plate by means of a latch mechanism including a hook-type latch portion 76a pivoted on a pin 82a mounted in a double-bent U-bracket 130 secured as by screws 132 to the back wall of the main supporting bracket 50a, the pin 82a serving as the fulcrum for the latch member. The latch member includes an integral finger piece 80a for actuating the hooked holding portion 76a. The latch hook is urged toward the engaged position by a leaf spring 88a carried by the bracket 130.

The lower and upper pedestal sections 46a, 48a are formed of square tubing, one flat wall of the lower tubing section 46a being secured to the front leg of the main supporting bracket 50a by welding as indicated at 54a.

The lower pedestal section 46a incorporates at its upper end an extension section 47a which may be adjustably fixed, as by bolt means 135, in any of various positions of adjustment so that it projects to different heights above the main section 46a (see FIG. 5).

The upper extremity of the extension section 47a carries means for pivotally supporting the upper or seat-supporting pedestal section, 48a, and for fixing the upper section in any of several different angular positions with respect to the lower section.

The top of extension section 47a is closed by a plug or cap member 140 having a cylindrical top portion 142 which is concentric with the axis of the bolt 150a which forms the hinge pin. As shown in FIG. 5 the member 140 has a skirt portion 144 which projects downwardly into the interior of the conformably squared extension tube section 47a and which is cross-apertured to permit passage of the pivot bolt 150a therethrough, the bolt thus serving to retain the cap 140. The skirt portion 144 of the cap is also shouldered as indicated at 145 to overlie the upper end of tube section 47a, which terminates just above the bolt 150a, the outer walls of that portion of the skirt which is above the shoulder 145 conforming to the proportions of the section 47a and forming a smooth upward extension thereof.

On each side of section 47a and spaced outwardly therefrom by washers 151, 152 are guard plates 154, 155, secured in place by bolts 156 and by the hinge bolt 150a, bolts 156 extending through suitable apertures in tube section 47a, spacer washers 151, 152, and guard plates 154, 155. Arcuate tongue-like flange portions 160 are provided, forming a part of a squared supporting and hinging sleeve section 162 in which the lower end of upper pedestal section 48a is fitted and secured, sleeve section 162 having its wall portion 164 (FIG. 4) which is normally at the top forward portion thereof extended to a position close to, and preferably in wiping engagement with, the cylindrical top portion 142 of the cap 140, so that during pivotal movement of the upper pedestal section no gap into which a finger may be thrust can occur at this point. Similarly, the flat side flange portions 160 of the sleeve 162 fit closely against the sides of the cap 140 and the tube section 47a, no gaps being left at the sides. The thickness of the flange sections 160 is the same as the thickness of the filler washers 151, 152, the flanges 160 serving to maintain the spacing of the upper portions of the guard plates 154, 155. The lower rear wall 165 of the sleeve portion 162 stops short of the lower extremity, leaving a space, designated 166, which is wide enough, at all positions of the hinged parts, so that a child's finger cannot be caught therein.

A sheet metal angle brace member generally designated 170, of channel section, is pivotally connected by a pivot bolt 172 to the top tube section 48a. The side flange portions 174 of brace member 170 are parallel to one another, and are of such thickness as to fit slidably, but substantially to fill the space between, tube section 47a and guard plates 154, 155. The spacing between side flanges 174 is such that two integral tongue portions 175, which form extensions of flanges 174, may project into the slotlike spaces 173 between the guard plates and the side walls of tube section 47a, as shown in FIGS. 4 and 5. The bight or cross-web portion 176, which is shown as ribbed to increase its stiffness, limits the degree of projection of the side flanges 174 and tongue portions 175 into the spaces 173. A plurality of cross apertures 177 are provided, extending through the guard plates and their supporting section 47a, the apertures being aligned upon opposite sides and adapted to receive a crossbolt as 178 serving as a stop to limit downward movement of tongue portions 175 and brace member 170. The upper pedestal section 48a of course tends to move downwardly, under load, to the lowermost position which the brace section permits, and by positioning the bolt 178 in different ones of the holes 177 the angular position, and so the height of the seat may be adjustably fixed at any of various desired positions.

A tension spring 179 is hooked at one end over the lower end of wall 165 and at the other end over the upper end of the central web 176 of the brace member, tending to draw the brace member, in a counterclockwise direction, as viewed in FIG. 4, toward the pedestal structure. The tension of the spring 179 is relatively light, and the slope of the lower walls of tongue portions 175 is such that the tongue portions and the lower end of the brace member can easily be swung free of the lower or fixed pedestal structure whenever the top section 48a is swung upwardly with respect to the lower section, although the spring will normally tend to maintain the tongue portions 175 in the slots 173 at all times during swinging movements of the upper section, unless some obstruction enters the space between the brace member 170 and the hinged portions. If a child's hand or any other object should be placed in the space between the hinged portions and the brace 170, and the upper pedestal section should then be moved, the brace member would simply swing away from the hinged portions, and the only pressure exerted on the hand or foreign object would be that imposed by the relatively light spring 179, regardless of how the seat or upper section 48a might be swung. As soon as the obstruction is removed, the brace will move into its intended overengaging relationship with the bolt 178 as soon as the seat is raised to or above the intended position and the seat may again be operated normally.

The tongue portions 175 are preferably provided with apertures as 180 so positioned that when the tongues are in their operative overengaged relationship with the bolt 178, the apertures 180 are in registry with the next higher pair of holes 177 to that in which bolt 178 is fitted. Thus, a simple cotter pin, or another bolt or any other shear resisting element (not shown) may be thrust through the aligned holes 177, 180, to lock the upper section 48a at a fixed angular relationship to the fixed lower section.

As shown in FIGS. 1, 7 and 8, the seat structure may take the form of a flat padded seat, generally designated 190, such structure including a flat board 191, secured to the upper leg of a U-shaped spring member 120a, the lower leg of such spring member being secured as by bolts 124 to the hinged pedestal section 48a, which may be provided with apertures as 195 in addition to those in which the bolts 124 are shown positioned, to permit the seat assembly to be secured to the pedestal in different positions. The seat is preferably also provided with an armrest and back structure formed of a sheet metal channel member and consisting of the side arm portions 194 and integral back portion 195. The side arm and back structure is carried by two swingable supports, each comprising a steel rod bent to generally flat-bottomed U-shape. The forward support consists of a cross-bight section 200 which extends beneath and is pivotally connected to the seat board 191, by double-bent U-brackets 202, and supporting link portions 196 integral with bight portion 200. The similar rear support includes a similar transverse bight section 204 carrying the rear arm supporting links 198 integral therewith, bight section 204 being pivotally mounted beneath the seat, and also beneath the upper leg of the seat-carrying spring structure 120a, by similar but suitably deepened double-bent bearing brackets 205. At their upper extremities, links 196, 198 are bent horizontally and pivotally connected as by bracket means 206, 208 to the side arm portions 194.

The structure consisting of the arm and back structure and supporting links 196, 198 may be folded like a parallelogram link structure, from the erected condition shown in full lines in FIG. 1 to the folded condition shown in broken lines in that view. When these parts are raised to their operative position shown in full lines, they may be locked in place by a flat locking bar 210. The locking bar 210 is supported for lateral sliding movement on top of the seat board 191, underneath the upholstery, and has a downbent finger portion 211 which projects accessibly from one side of the seat. The opposite end of the locking bar 210 is provided with a U-shaped notch 212 proportioned to snugly overengage the link portion 198 on that side of the seat when link 198 is in the raised position. When the locking bar is pulled out by the finger piece located upon the opposite side of the seat, however, the notch 212 is freed from the link portion 198, as indicated at 213 in dotted lines in FIG. 7. As also shown in FIG. 7, the locking bar is provided, near its end which carries the finger portion 211, with an L-shaped cut-out portion 214, such cut-out portion having a blind end portion extending parallel to the locking bar and terminating short of the free end thereof which carries the finger portion 211, while the other leg of the cut-out opens at the edge of the bar toward the back of the seat, such open end portion being designated 215. The L-shaped cut-out portion is so proportioned that when the locking bar is pulled to the position 213, to free the notch 212 from the bar 198, the portion 215 of the cut-out 214 is aligned with the link portion 198 at its side of the seat, and the U-bar structures comprising the link arms 196—198 and crossbar portions 200—204 can then be swung downwardly and rearwardly with respect to the seat cushion, thereby folding the linkage structure which also includes the seat arms 194 and back 195 to the positioning in which they lie close to the seat 190, as shown in dotted lines in FIG. 1.

The dotted line showing of FIG. 1 also shows the upper seat supporting pedestal section 48a swung upwardly, and it will be appreciated that the ability to move the parts to the position thus indicated in dotted lines will permit the entire supplemental seat structure, when installed in the rear compartment of a conventional sedan, for example, to be swung upwardly and forwardly to a positioning where the entire structure lies closely adjacent to or against the rear of the front seat, so that it occupies a minimum of useful space and presents minimum obstruction to free use of the rear passenger compartment and to ingress and egress, while similarly, if installed in the front compartment, this folded condition will permit all parts to lie close to the instrument panel, where they present minimum interference to free use of the front passenger compartment and the front seat of the vehicle.

Referring again to the prop member 170, it is to be noted that in normal operation, whenever the upper pedestal section 48a is swung downwardly from a raised position such as is shown in broken lines in FIG. 1, to the operative position shown in full lines, the tongues 175 slide downwardly in the slot-like spaces between guard plates 154—155 and the side walls of the lower pedestal section extension portion 47a. During such downward movement the lower end 176′ of the cross web portion 176 of the prop rubs along the back wall of portion 47a, being held in engagement therewith by the spring 179, and the abutment tongues 175 are thus guided downwardly into engagement with the abutment pin 178.

The slots 153 into which the prop tongues 175 project to engage the abutment screw 178 are of course too small to admit a child's finger. The extent to which the tongues 175 can overhang the abutment screw 178 is also less than the thickness of a child's finger, so that even if the child should place its finger between the prop end 176 and the pedestal, no injury will result because the finger will keep the tongues 175 from effectively overengaging the abutment screw.

While it will be apparent that the preferred embodiment of the invention herein described is well calculated to fulfill the objects and advantages first above stated, it will be appreciated that the invention is susceptible to variation, modification and change without departing from the fair meaning and proper scope of the appended claims.

What is claimed is:

1. In a support for a seat or the like, two rigid, hingedly interconnected pedestal sections including a lower section, an upper section, means pivotally connecting the upper section to the lower section for swinging movement about a substantially horizontal axis, and means for limiting downward swinging movement of the upper section with respect to the lower section, comprising a prop, a fulcrum portion pivotally connecting one end of said prop to one of said sections, the other end of said prop being independently swingable about said fulcrum portion toward and from the other of said sections and being separably engageable, in a direction longitudinal with respect to the prop, with an abutment portion carried by said other section, means yieldably urging said prop in an angular direction toward said other section about said fulcrum portion, the pedestal section with which the prop is separably engageable being provided with a longitudinal slot extending in a direction perpendicular to the first-mentioned axis, the abutment portion being located in said slot, said other end of the prop being swingable in a path in which it is guided by said fulcrum portion to carry said other end of the prop into and out of the slot and into and out of engagement with the abutment portion, guide portions limiting the extent to which said other end of the prop extends into the slot and slidably guiding said other end into engagement with the abutment portion, the pedestal section with which the prop is separably engageable being of rectangular cross section, said prop having a pair of terminal abutments spaced apart a distance slightly exceeding the width of such pedestal section and adapted to overengage opposite sides thereof and to engage said previously mentioned abutment portion.

2. In a support for a seat or the like, two rigid, hingedly interconnected pedestal sections including a lower section, an upper section, means pivotally connecting the upper section to the lower section for swinging movement about a substantially horizontal axis, and means for limiting downward swinging movement of the upper section with respect to the lower section, comprising a prop, a fulcrum portion pivotally connecting one end of said prop to one of said sections, the other end of said prop being independently swingable about said fulcrum portion toward and from the other of said sections and being separably engageable, in a direction longitudinal with respect to the prop, with an abutment portion carried by said other section, means yieldably urging said prop in an angular direction toward said other section about said fulcrum portion, the pedestal section with which the prop is separably engageable being provided with a longitudinal slot extending in a direction perpendicular to the first-mentioned axis, the abutment portion being located in said slot, said other end of the prop being swingable in a path in which it is guided by said fulcrum portion to carry said other end of the prop into and out of the slot and into and out of engagement with the abutment portion, guide portions limiting the extent to which said other end of the prop extends into the slot and slidably guiding said other end into engagement with the abutment portion, the pedestal section with which the prop is separably engageable being of rectangular cross section, said prop having a pair of terminal abutments spaced apart a distance slightly exceeding the width of such pedestal section and adapted to overengage opposite sides thereof, and a pair of guard plates secured to and spaced outwardly from the sides of such pedestal section, said terminal abutments being projectable into and retractable from the spaces between said guard plates and said pedestal section.

3. In a support for a seat or the like, two rigid, hingedly interconnected pedestal sections including a lower section, an upper section, means pivotally connecting the upper section to the lower section for swinging movement about a substantially horizontal axis, and means for limiting downward swinging movement of the upper section with respect to the lower section, comprising a prop, a fulcrum portion pivotally connecting one end of said prop to one of said sections, the other end of said prop beind independently swingable about said fulcrum portion toward and from the other of said sections and being separably engageable, in a direction longitudinal with respect to the prop, with an abutment portion carried by said other section, means yieldably urging said prop in an angular direction toward said other section about said fulcrum portion, the pedestal section with which the prop is separably engageable being provided with a longitudinal slot extending in a direction perpendicular to the first-mentioned axis, the abutment portion being located in said slot, said other end of the prop being swingable in a path in which it is guided by said fulcrum portion to carry said other end of the prop into and out of the slot and into and out of engagement with the abutment portion, guide portions limiting the extent to which said other end of the prop extends into the slot and slidably guiding said other end into engagement with the abutment portion, the pedestal section with which the prop is separably engageable being of rectangular cross section, said prop having a pair of terminal abutments spaced apart a distance slightly exceeding the width of such pedestal section and adapted to over-engage opposite sides thereof, and a pair of guard plates secured to and spaced outwardly from the sides of such pedestal section, said terminal abutments being projectable into and retractable from the spaces between said guard plates and said pedestal section, said spaces defining a pair of such slots, said previously mentioned abutment portion comprising a pin projecting through said pedestal section and through said guard plates and slots.

4. In a support for a seat or the like, two rigid, hingedly interconnected pedestal sections including a lower section, an upper section, means pivotally connecting the upper section to the lower section for swinging movement about a substantially horizontal axis, and means for limiting downward swinging movement of the upper section with respect to the lower section, comprising a prop, a fulcrum portion pivotally connecting one end of said prop to one of said sections, the other end of said prop being independently swingable about said fulcrum portion toward and from the other of said sections and being separably engageable, in a direction longitudinal with respect to the prop, with an abutment portion carried by said other section, means yieldably urging said prop in an angular direction toward said other section about said fulcrum portion, the pedestal section with which the prop is separably engageable being provided with a longitudinal slot extending in a direction perpendicular to the first-mentioned axis, the abutment portion being located in said slot, said other end of the prop being swingable in a path in which it is guided by said fulcrum portion to carry said other end of the prop into and out of the slot and into and out of engagement with the abutment portion, guide portions limiting the extent to which said other end of the prop extends into the slot and slidably guiding said other end into engagement with the abutment portion, the pedestal section with which the prop is separably engageable being of rectangular cross section, said prop having a pair of terminal abutments spaced apart a distance slightly exceeding the width of such pedestal section and adapted to over-engage opposite sides thereof, and a pair of guard plates secured to and spaced outwardly from the sides of such pedestal section, said terminal abutments being projectable into and retractable from the spaces between said guard plates and said pedestal section, said spaces defining a pair of such slots, said abutment portion comprising a pin removably projectable through said pedestal section, guard plates and slots in any of a plurality of different positions.

References Cited in the file of this patent

UNITED STATES PATENTS

| | | |
|---|---|---|
| 667,992 | Patzold | Feb. 12, 1901 |
| 1,262,374 | Moore | Apr. 9, 1918 |
| 1,702,517 | Morley | Feb. 19, 1929 |
| 2,249,287 | Gearhart | July 15, 1941 |
| 2,675,056 | Bell | Apr. 13, 1954 |
| 2,886,093 | Grady | May 12, 1959 |

FOREIGN PATENTS

| | | |
|---|---|---|
| 56,149 | Germany | Apr. 23, 1891 |
| 364,573 | Italy | Nov. 9, 1938 |